United States Patent [19]

Haake, Sr.

[11] Patent Number: 5,148,626

[45] Date of Patent: Sep. 22, 1992

[54] INSECT BARRIER AND DETERRENT DEVICE

[75] Inventor: Kenneth H. Haake, Sr., Buffalo, Tex.

[73] Assignee: Ants-Away, Inc., Bryan, Tex.

[21] Appl. No.: 554,291

[22] Filed: Jul. 17, 1990

[51] Int. Cl.⁵ .................. A01M 1/10; A01K 5/00
[52] U.S. Cl. ...................... 43/121; 43/109; 43/131; 43/132.1; 119/61
[58] Field of Search ............. 43/107, 121, 109, 132.1, 43/131; 119/61

[56]         References Cited

U.S. PATENT DOCUMENTS

| | | | |
|---|---|---|---|
| 52,576 | 2/1866 | Lamb | 43/121 |
| 2,233,832 | 3/1941 | Byrd | 43/107 |
| 2,584,301 | 2/1952 | Sinclair | 119/61 |
| 3,187,722 | 6/1965 | Gilmore | 119/61 |
| 3,202,131 | 8/1965 | Jones | 119/61 |
| 4,128,080 | 12/1978 | Haney | 119/51.5 |
| 4,205,629 | 6/1980 | Wix | 119/51.5 |
| 4,399,772 | 8/1983 | Salinas | 119/51.5 |
| 4,546,730 | 10/1985 | Holland | 119/117 |
| 4,658,759 | 4/1987 | Brown | 119/61 |
| 4,699,089 | 10/1987 | Teschke | 119/51.5 |
| 4,802,302 | 2/1989 | Alnafissa | 43/121 |
| 4,803,954 | 2/1989 | Welch et al. | 119/61 |

*Primary Examiner*—Kurt Rowan

*Attorney, Agent, or Firm*—William E. Shull

[57]         ABSTRACT

An insect barrier and deterrent device for preventing crawling insects from obtaining access to the contents of a food or water containing structure or a food preparation surface from the adjacent ground, floor, or other support surface. One embodiment of the barrier includes an insecticide-charged spongy member disposed under a protective cover. The spongy member according to one embodiment is retained on a support member. The cover may be removably disposed over the spongy member. Another embodiment of the spongy member is affixed to the underside of a flange around the upper outer edge of a pet dish or the like, within a downwardly extending lip on the flange. Another embodiment of the invention includes a slick member of a suitable plastic or other substance in place of the charged spongy member. Another embodiment of the invention includes a protective cover with a downwardly extending lip around its outer peripheral edge and an anchor stake affixed to its underside near its center. A charged spongy member is slidingly received on the anchor stake and disposed against the underside of the protective cover, within the lip. A retainer is slidingly received and frictionally retained on the anchor stake below the charged spongy member for supporting the spongy member in place.

13 Claims, 3 Drawing Sheets

INSECT BARRIER AND DETERRENT DEVICE

BACKGROUND OF THE INVENTION

The present invention relates generally to pest control methods and apparatus, nd more particularly to an insect barrier and deterrent device or preventing ants, roaches, and other crawling insects from obtaining access to the contents of a food or water containing structure, such as a pet dish or livestock trough or feeder, or a food preparation surface, such as a kitchen table, from the adjacent ground, floor, or other support surface.

Pet owners frequently leave food and/or water dishes outdoors for use by their pets. It is not uncommon for pet dishes to be left outdoors around the clock, and not just at mealtimes. Outdoor pets are usually fed outdoors, so keeping the dishes outside at all times is reasonable. Moreover, some owners of outdoor pets may simply find it inconvenient to bring food or water dishes indoors; others may consider the convenience of the pets in having food and water handy at all times as reason enough to leave the dishes filled and outside.

Even for indoor pets, however, some persons might choose to feed them and keep their dishes outside simply for health reasons. In some case, such as for very large pets or those that are not fully domesticated, it would be extremely impractical or unwise to consider feeding such animals indoors, so their dishes or trays are placed outside by necessity. Livestock are frequently provided with outdoor feeding trays or troughs. Even if such livestock feeders are located inside a barn or similar structure, however, as far as access by ants or other insects is concerned, the feeders might as well be outdoors.

In all of those situations discussed above where food and/or water containers for pets or other animals are left outside for extended periods, a problem exists with ants, roaches, and other insects or pests gaining access to the contents of such containers before the pet or other animal has finished with them. This is troublesome and wasteful, because usually the unfinished food will have to be disposed of. The pets will usually refuse to eat from the insect-contaminated dishes, and the owners usually will be reluctant to attempt to rid the dishes of insects while retaining the contents. Besides the adverse effects of such insect contamination on the health and disposition of the pet, the pet owner's disposition is not likely to be uplifted by discovering that his pet's dish has fostered an insect infestation on his patio or back porch. Even in situations where the animal continues to eat or drink from the insect-contaminated dish or the like, such contamination is undesirable, because there is still the possibility that the insects will bite or sting the animal, or otherwise adversely affect its health. If nothing else, such insect infestation is very displeasing aesthetically.

Insect infestation is not a problem limited to the outdoors, however; pet dishes are also susceptible of drawing ants and the like even when left indoors. Infestation of pet dishes left indoors, while probably relatively less common, is nonetheless troubling. In addition, food preparation surfaces such as tables and counters typically found in home kitchens and commercial establishments are also likely to attract crawling insects. Many of such tables and counters are of the free-standing type, supported by legs as opposed to being attached to a wall or the like. For tables and counters such as these, if insects are deterred from crawling up the legs, then the food and food preparation surfaces above are more easily kept crawling insect-free.

Furthermore, insects such as ants, and in particular fire ants, are bothersome pests whether or not they invade outdoor pet food dishes. Children and pets often fall victim to the stinging bite of the fire ant while playing outdoors. Adults working or lounging in the yard can also be surprised by the sudden sting of these tiny but aggressive creatures. While there are insecticides on the market for controlling yard pests such as fire ants, they are usually simply applied to the infested areas and then left exposed to the elements, as well as people or pets in the vicinity. This could lead to unintended exposure of the people or pets to powerful, potentially harmful chemicals. Moreover, exposed chemicals are susceptible of being scattered by lawnmowers, or drawn up into bagging-type mowers along with the grass clippings.

Several different approaches have been taken in the past toward providing a crawling insect-free pet dish. For example, Welch et al. U.S. Pat. No. 4,803,954 discloses a pet bowl having an outer liner with a first downwardly and outwardly extending annular lip near its upper end, and an inner liner spaced from the outer liner and with a second downwardly and outwardly extending annular lip at its upper end. The two liners are removably attached to one another, as by a snap-together fit. A non-toxic substance such as petroleum jelly is placed on the surfaces enclosing the space between the liners. The gap and lips, and the non-toxic substance on the opposing faces of the gap, are intended to prevent crawling insects from gaining access to the contents of the bowl. Salinas U.S. Pat. No. 4,399,772 discloses an animal feeder with a water-filled base and an arm extending upwardly from the base. A feed bowl(s) is supported from the arm, with the water acting as a physical barrier to passage of crawling insects. A combined food and water dish is disclosed in Haney U.S. Pat. No. 4,128,080. The Haney apparatus suspends the food dish from a post in the middle of the water dish, the water again acting as a barrier to passage of insects from the floor or ground to the food dish. Use of a water-filled barrier (or "moat") around the food dish is also disclosed in Sinclair U.S. Pat. No. 2,584,301. The Sinclair device also raises the food dishes off the ground on legs.

Elevated pet dishes also have been proposed in the past, although not necessarily for the purpose of keeping the dishes crawling insect-free. Sometimes elevation of the dishes has been proposed for facilitating the pet's reaching the contents regardless of the size of the pet. See, for example, Brown U.S. Pat. No. 4,658,759; Wix U.S. Pat. No. 4,205,629. Holland U.S. Pat. No. 4,546,730 discloses an elevated pet dish combined with a tether. The elevated dish of Holland is also disclosed as being anchored so as not to be easily overturned. Anchoring of a pet dish to avoid overturning is also disclosed in Jones U.S. Pat. No. 3,202,131. An elevated pet dish combined with a food storage facility is disclosed in Teschke U.S. Pat. No. 4,699,089.

While the insect-free pet dishes of the prior art may have some advantageous features peculiar to each of them, none of them is as simple and inexpensive to make and as easy to use as the preferred embodiment of the pet dish of the present invention. The Welch device, for example, with its snap-together double walls and specially formed lips is much more complicated than the preferred embodiment of the pet dish of the present invention. Moreover, the Welch device is not adapted for use with insecticides as is the present invention, which is discussed in detail below. The water barrier devices are also relatively complicated, and also suffer the drawback of having the water barrier subject to spillage, evaporation, and the like. While elevation of the pet dishes as disclosed in the prior art discussed above lends itself to insect protection, such elevation alone will not prevent insects from gaining access to the contents; such elevation must be combined with a barrier in order to keep the food crawling insect-free.

It is an object of the present invention to provide a pet dish which is crawling insect-free, and which does not suffer from the drawbacks of the prior art discussed above. It is also an object of the present invention to provide such an insect-free pet dish which is simple and inexpensive to manufacture, easy to use, and effective for keeping crawling insects away from the contents of the dish.

It is another object of the present invention to provide a removable barrier to crawling insects which can be installed on the legs of a table or counter for preventing the insects from gaining access to the food or food preparation surface above the barrier.

It is a still further object of the present invention to provide a device having a renewable or rechargeable barrier of insecticide-containing material for preventing crawling insects from obtaining access to the contents of a food or water containing structure, such as a pet dish or livestock trough or feeder, or a food preparation surface, such as a kitchen table, from the adjacent ground, floor, or other support surface. It is another object of the present invention to provide protection of the insecticide-containing material from the elements, and from access by the pets.

It is another object of the present invention to provide a barrier of a slick plastic substance in place of the insecticide-containing material in the invention as discussed in the preceding paragraph.

It is a still further object of the present invention to provide elevation for a pet dish, coupled with an improved, effective, renewable insect barrier.

It is another object of the present invention to provide a protected barrier of insecticide-containing material to cover an ant mound or the like, in order to contain the insecticide and prevent its scattering or dispersal by mowers or the elements, and to prevent contact by people and pets. It is another object of the present invention to provide an anchoring means for holding the barrier close to the ground and permitting a mower to pass over it without harm.

SUMMARY OF THE INVENTION

According to one embodiment of the invention, a pet dish is removably disposed on a stake insertable in the ground. The stake is slidingly received and releasably retained within a base resting on the ground, such that the height of the dish above the ground is adjustable. An annular member of rubber or plastic foam or other sponge-like material is split at one radial location, and the diametrically opposite side of the annular member is split and hinged so as to permit the halves of the annular member to be rotated about the hinge away from and toward one another alternately to open the member and to form an annulus, respectively. When opened, the spongy member can be placed around or removed from the stake. The opposing ends of the annular member are provided with a latch, such as one made of Velcro, for locking the member in closed position around the stake. A retainer is releasably and adjustably mounted on the stake at a desired height above the base for supporting the spongy member. An annular protective cover is slidingly placed on the stake above and supported by the spongy member. The protective cover has an upper annular surface and a downwardly extending annular lip for covering the spongy member from the top and sides. The annular spongy member is charged with an insecticide or other suitable insect repelling substance. The charged annular spongy member and the protective cover serve as a barrier to passage of ants or other crawling insects from the ground to the food dish disposed on the end of the stake.

In another embodiment of the invention, an insecticide-charged spongy member, protective cover, and retainer such as discussed in the preceding paragraph are disposed on a pole supporting a livestock feeding tray or the like. In yet another embodiment of the invention, the insecticide-charged spongy member, protective cover, and retainer are placed on the legs of a table or counter between the floor or other support surface and the table top.

According to another embodiment of the invention, a pet dish has an outwardly extending flange around its upper end, and the flange has a downwardly extending lip around its outer peripheral edge. An insecticide-charged spongy member like the annular member referred to above is mounted to the underside of the outwardly extending flange. The lip extends below the lower surface of the spongy member, so that the flange and lip cover the spongy member from the top and sides of the pet dish.

According to another embodiment of the invention, a slick member of a suitable plastic or other substance is used in place of the charged spongy member.

According to another embodiment of the invention, a protective cover having an upper surface and a downwardly extending lip around its outer peripheral edge includes an anchor stake affixed to the underside of the upper surface near its center. A charged spongy member is slidingly received on the anchor stake and disposed against the underside of the upper surface of the protective cover, within the area covered from the top and sides by the upper surface and the lip. A retainer is slidingly received and frictionally retained on the anchor stake below the charged spongy member for supporting the spongy member in place. The anchor stake of the protective cover is inserted into the ground and into an ant-infested area, with the protective cover being placed closely adjacent to the ground.

BRIEF DESCRIPTION OF THE DRAWINGS

These and other features and advantages of the invention will be apparent from the following detailed description, taking into account the foregoing discussion, and read in conjunction with reference to the following drawings wherein:

FIG. 4 is an isometric view of a protective cover, charged annular spongy member, and retainer like those shown in FIGS. 1-3 in place on a pole supporting a food tray or the like;

DETAILED DESCRIPTION OF THE PREFERRED EMBODIMENTS OF THE INVENTION

Figure 2:
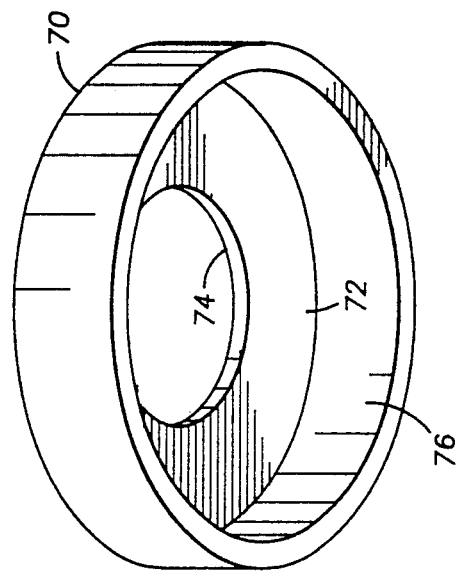
FIG. 2 is an isometric view of the protective cover used with the apparatus of FIG. 1.
Figure 3:
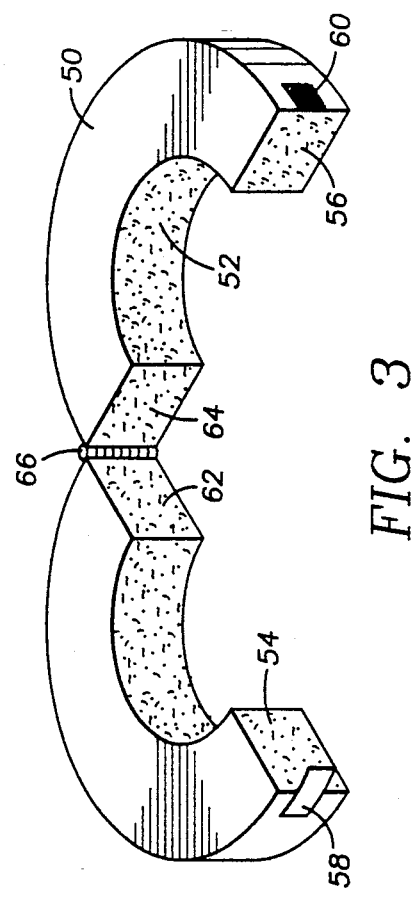
FIG. 3 is an isometric view of the hinged, split, charged annular spongy member used with the apparatus of FIG. 1.
Figure 1:
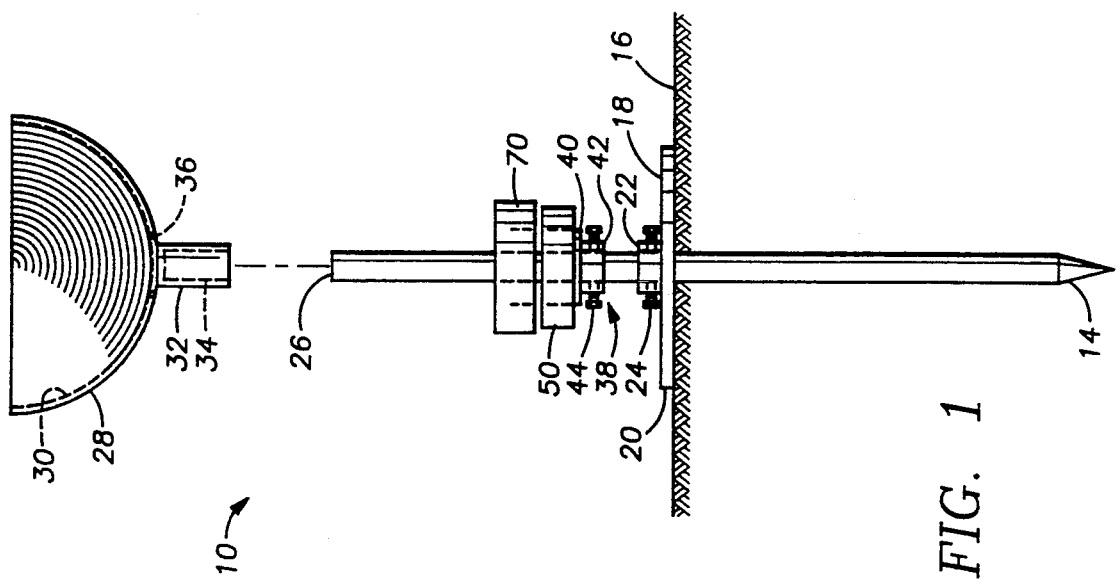
FIG. 1 is an elevational view of an adjustable height, crawling insect-free pet dish according to the present invention, showing the annular charged spongy member and retainer in place on the stake, and the removable pet dish and protective cover in exploded positions with respect to the stake and the annular charged spongy member, respectively.

Referring initially to FIGS. 1-3, there is disclosed generally at 10 an adjustable height, crawling insect-free pet dish assembly according to the present invention. Pet dish 10 includes a stake 12 having a pointed end 14 adapted to be driven into the ground 16. Stake 12 may be made of wood, metal, plastic, or other suitable durable and deterioration-resistant material. Since pet dish 10 is intended to be left outdoors, stake 12 (and the other parts of pet dish assembly 10 except for the split spongy member) is advantageously made of a weatherproof material such as PVC plastic. Stake 12 is slidingly received in the bore of a base 18 having a support plate 20 resting on the ground 16, and an upwardly extending boss 22 disposed on the plate 20. Boss 22 and plate 20 may comprise a single piece, or the boss may be glued or otherwise affixed to the plate. Thumbscrews or the like, shown at 24, are threadedly received in the boss 22 and may be tightened against the stake, thereby releasably retaining the stake within the base and permitting adjustment of the height of upper end 26 of stake 12 above the ground surface 16. A pet dish 28 includes an upper bowl portion 30 and a lower neck portion 32 disposed on the underside of the bowl portion. Neck portion 32 includes a central blind bore 34 in which end 26 of stake 12 is insertable. Bore 34 has a close sliding fit over stake 12. Bowl portion 30 preferably has a plurality of drain holes 36 in its bottom to prevent accumulation of rainwater or the like therein.

A retainer member 38 having a central bore therethrough is slidingly disposed on stake 12 above boss 22 of base 18. Stake 12 is received in the bore of the retainer member. Retainer member 38 has an upper support surface 40 and a lower boss portion 42 preferably affixed thereto. Boss portion 42 of retainer member 38 includes thumbscrews 44 which may be tightened against stake 12 like thumbscrews 24, for releasably affixing retainer member 38 at a selected location on stake 12.

An annular member 50 of rubber or plastic foam or other suitable spongy material is slidingly disposed on stake 12 above and supported by the retainer member 38. Spongy member 50 has a central bore 52 in which stake 12 is received. The diameter of bore 2 is preferably slightly less than the outside diameter of stake 12, so that the spongy member 50 is slightly compressed when placed on stake 12 to obtain a close fit therewith. Spongy member 50 is split at one radial location as shown at 54, 56 in FIG. 3. The opposing ends 54, 56 have latch means members 58, 60 affixed thereto, respectively, for latching the ends 54, 56 together when placed in abutting relation to one another. Latch means members 58, 60 may comprise, for example, a Velcro-type connection. Spongy member 50 is also split at the diametrically opposed radial location, as shown at 62, 64 in FIG. 3. At the radially outer periphery of the split 62, 64, there is disposed a hinge means 66, such as, for example, a strip of thin plastic material, for permitting the two halves of the annular spongy member 50 to rotate about the hinge 66 to open and close the annulus. Since the member 50 is preferably made of a flexible spongy material, it may not require a separate hinge 66. For example, member 50 may be made to open and close by partially splitting member 50 opposite split 54, 56; that is, a radially outermost portion of the body of member 50 may be left intact. If member 50 were sufficiently flexible, then even a partial split may not be required; the body may be opened and closed with only one split 54, 56. The member 50 may be opened to place it on and remove it from the stake 12; it is closed around the stake and the ends 54, 56 are latched together in service.

Above spongy member 50, an annular protective cover 70 having an upper annular cover surface 72 with a central bore 74 therein is slidingly disposed on stake 12. Stake 12 is slidingly received in bore 74. The bore 74 is preferably of substantially the same diameter as the outer diameter of stake 12 so as to give the protective cover 70 a close fit against the stake. If the spongy member 50 is not in a snug fitting relationship with stake 12, then the protective cover 70 must have such a snug fit with the stake to prevent insects from passing along the stake between the stake and the cover 70. If member 50 has such a snug fit with stake 12, then cover 70 may, but need not, have such a snug fit with stake 12. In the latter event the member 50 will prevent passage of insects along the stake from below to above member 50. Cover 70 has a downwardly extending lip 76 around its outer periphery. The inside diameter of cover 70 at lip 76 is substantially the same as the outside diameter of spongy member 50. Lip 76 is at least as great in axial height as spongy member 50, so that when the cover 70 is placed on the stake and lowered into place over spongy member 50, the spongy member is entirely disposed within the area defined by the surface 72 and lip 76, protected from the top and sides thereby.

Spongy member 50 is charged or filled with a suitable, preferably long-lasting and powerful insecticide or other insect repelling or deterring substance. Although any suitable insecticide may be used for charging or soaking spongy member 50, those which may be found suitable include ant and roach killers such as those marketed under the Raid, Black Flag, or Green Light labels. The insecticide-soaked spongy material 50 and cover 70 act as a barrier, substantially preventing ants or other crawling insects from passing from the ground 16 to the dish 2 along stake 12. The insecticide is protected from the elements and the pets by the cover 70. Many ants and other insects will be repelled from attempting to cross the spongy material by the presence of the insecticide in spongy member 50. Those ants or other insects which are not so repelled from attempting to traverse the spongy material will be killed by the insecticide. As a result, the bowl 28 will be kept substantially crawling insect-free.

When insects begin to reappear in bowl 28, more insecticide may be added to spongy member 50. To do this, the cover 70 is lifted up, and insecticide is applied to the exposed spongy member 50 until it is suitably moist. The cover 70 is then lowered back onto spongy member 50. If removal of the spongy member 50 is desired, for example to replace it with a new one, the latch 58,60 is released, the member 50 is opened by rotating its halves around hinge 66, and the member 50 is removed from the stake 12. Replacement of the same or a new member 50 can then proceed, obviously by reversing those steps.

Figure 4:
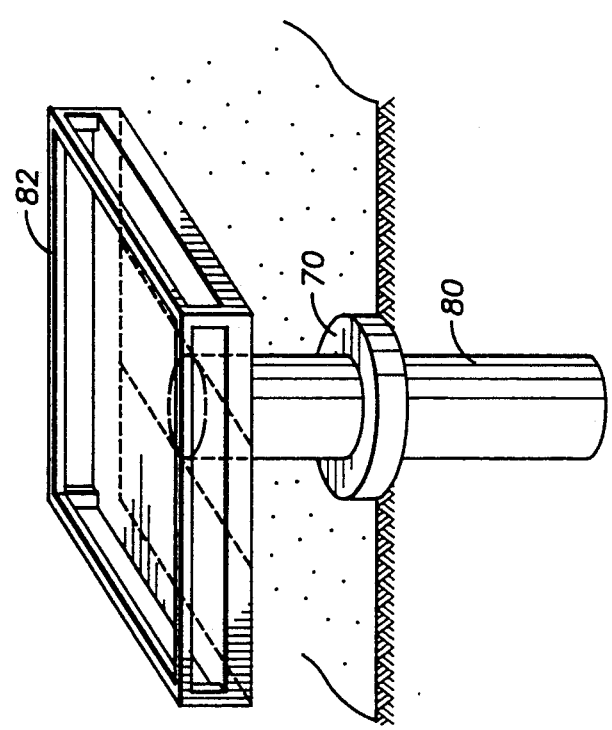

It should be understood that the cover 70, insecticide-charged spongy member 50, and retainer 38 may be used on other support members than stake 12, and with other than a dish such as that shown at 28 supported thereby. For example, as shown in FIG. 4, cover 70 may be supported on a pole 80 by a retainer 38 (not shown) and spongy member 50 (not shown), the pole 80 supporting a livestock feed tray 82 on its upper end. Feed tray 82 is preferably removable from pole 80 to enable easy insertion of retainer 38 and cover 70 thereon. Cover 70, insecticide-charged spongy member 50, and retainer 38 may also be used on the legs of a table or counter, such as an outdoor picnic table, a kitchen table, or a food preparation table or counter in a restaurant or the like. In that event, the cover and retainer usually must be inserted on the legs from their lower ends. Since the spongy member is split, it may be inserted on and removed from a table leg or the like without removing the retainer or cover. Since the table legs or other support members may not be circular in cross section, the shape of the bores in the cover, spongy member, and retainer may have to be other than circular in order closely to conform to the shapes thereof.

Figure 5:
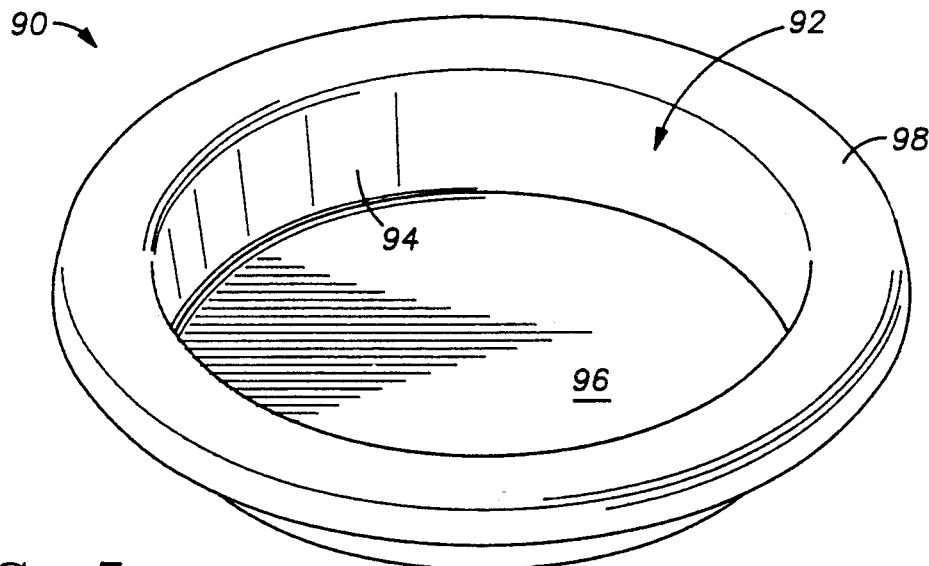
FIG. 5 is an isometric view of another pet dish according to the invention, this embodiment having a flange around the upper end of the dish and a downwardly extending lip around the outer peripheral edge of the flange, and a spongy charged member mounted to the underside of the flange within the lip.
Figure 6:
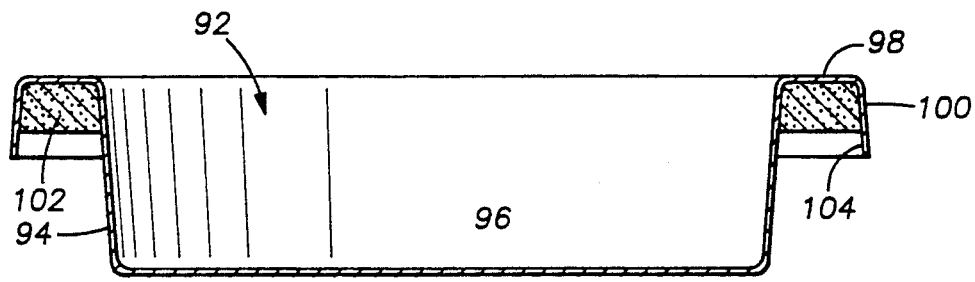
FIG. 6 is a vertical cross sectional view of the pet dish of FIG. 5.
Figure 7:
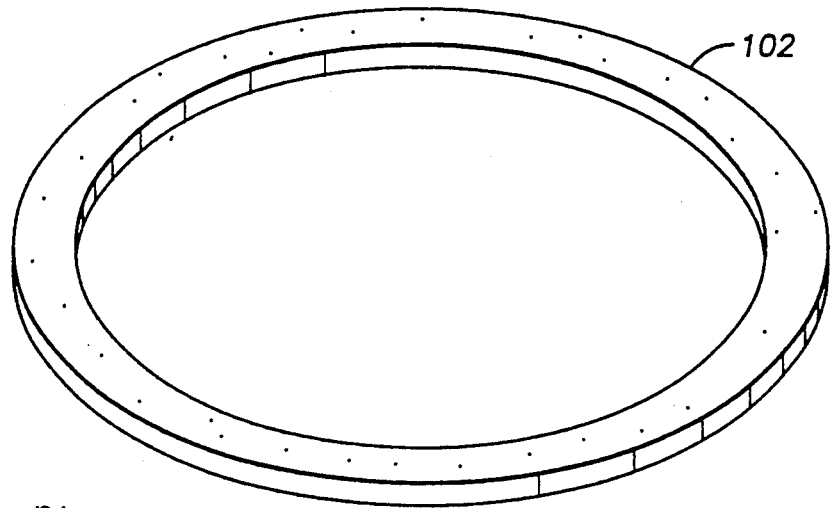
FIG. 7 is an isometric view of the spongy charged member of the pet dish of FIG. 5.

Another embodiment of the present invention is shown in FIGS. 5-7. A crawling insect-free pet dish of this embodiment of the invention is shown generally at 90. Dish 90 includes a bowl portion 92 having side walls 94 and a bottom 96. At the upper end of side walls 94, there is disposed an outwardly extending flange 98. Flange 98 extends around the entire circumference of dish 90. Flange 98 includes a downwardly extending lip 100 around its entire radial outer periphery. An annular member 102 of spongy material like that used for member 50 described above is affixed to the underside of flange 98. It is preferred that member 102 be removably attached to flange 98, as by Velcro or the like, so that member 102 may be replaced if desired. The lip 100 preferably extends below the lower surface of the spongy member 102, as shown at 104. The spongy member 102 may comprise a single piece, or a plurality of segments or sections forming a complete ring. Pet dish 90 need not be circular as shown in FIG. 5. Other shapes may obviously be employed for dish 90, and in that event the flange 98, lip 100, and spongy member 102 will be shaped to conform thereto. Spongy member 102 is charged with an insecticide or other insect repelling or deterring substance such as that described above for spongy member 50. As in the cases of the other embodiments of the invention described above, the spongy member 102 and the lip 100 will substantially prevent ants or other crawling insects from gaining access to bowl 92 from the adjacent ground, floor, or other support surface.

Figure 8:
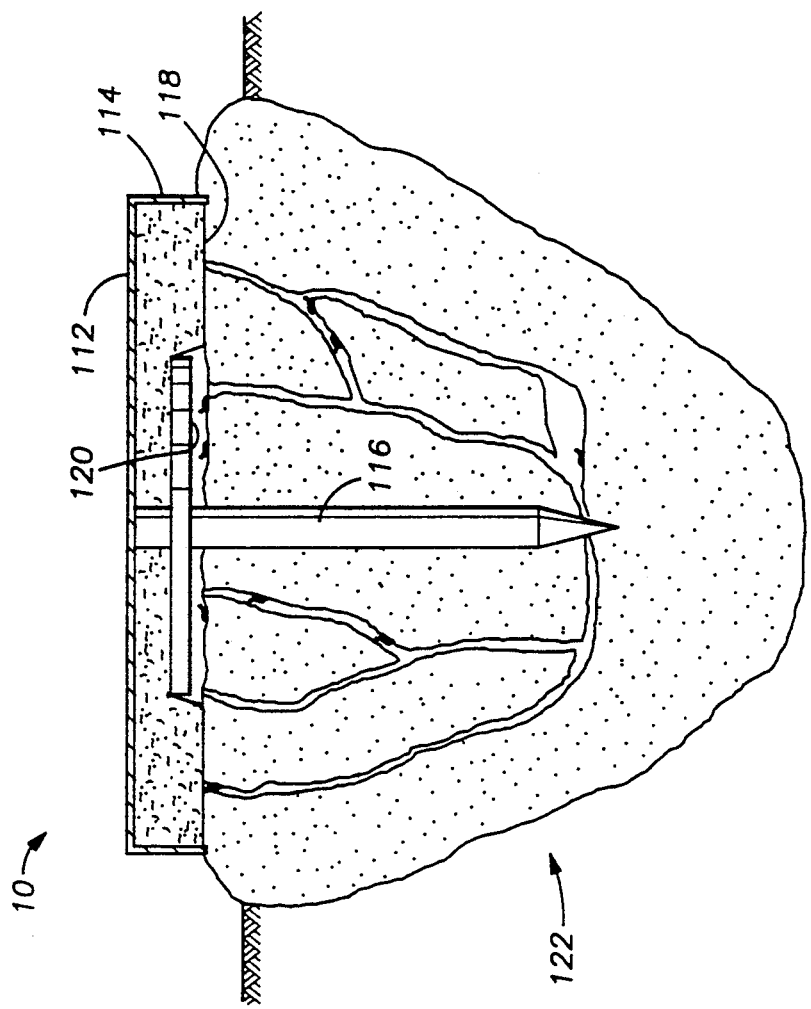
FIG. 8 is a vertical cross sectional view of another embodiment of the invention, this embodiment being adapted to be anchored over an ant-infested area.

Another embodiment of the present invention is shown in FIG. 8. According to this embodiment, a protective cover 110 having an upper surface 112 and a downwardly extending lip 114 around its outer peripheral edge includes an anchor stake 116 affixed to the underside of the upper surface 112 near its center. An insecticide-charged spongy member 118 having a central bore therein is slidingly received on the anchor stake 116 and disposed against the underside of the upper surface 112 of the protective cover 110, within the area covered from the top and sides by the upper surface 112 and the lip 114, respectively. The anchor stake 116 is received in the bore of the spongy member 118. A retainer 120 is slidingly received and frictionally retained on the anchor stake 116 below the charged spongy member 118 for supporting the spongy member in place. The retainer 120 has a central bore therein in which the anchor stake is received. The anchor stake has a close sliding fit with the retainer 120.

The anchor stake of the protective cover 110 is inserted into the ground and into an ant-infested area 122, with the protective cover being placed closely adjacent to the ground. The protective cover 110 has a low profile that permits a mower or other lawn care device to pass over it without striking it. The anchor stake 116 keeps the cover 110 in place and prevents it from being displaced or possibly destroyed by the mower. If there is no danger that the cover 110 will be subject to a mower passing overhead, then the anchor stake 116 may not be necessary. In that event, the stake may be shortened sufficiently to leave a stub or short section on which the retainer 120 may be disposed.

As stated earlier, the cover 110 will keep the insecticide disposed in spongy member 118 contained under the cover, out of danger of being contacted by people or pets. In addition, cover 110 will keep any other insecticide applied directly to infested area 122, that is, insecticide applied other than with or in the spongy member 118, so contained and out of reach of people and pets. One embodiment of the protective cover 110 is preferably colored green so as to remain relatively inconspicuous in a grass lawn.

As an alternative to the charged spongy member 50 or the charged spongy member 102, the present invention contemplates that an extremely slick material, such as an ultra high molecular weight polyethylene, may be used for a barrier member under the protective cover 70 or the flange 98, respectively. In that event, an insecticide is not necessary. The extremely slick material prevents the ants or other insects from obtaining a foothold thereon, thereby preventing them from traversing the barrier comprising the slick material and the protective cover or flange.

While preferred embodiments of the invention have been shown and described, many modifications thereof may be made by those skilled in the art without departing from the spirit of the invention. Accordingly, the scope of the invention should be determined in accordance with the following claims.

I claim:

1. A barrier for placement on a shaft for preventing crawling insects from passing from a first location on the shaft below the barrier to a second location on the shaft above the barrier, comprising:

an integral member comprising a body of spongy material mounted on and substantially entirely surrounding said shaft, said member of spongy material being charged with an insect repelling substance; and a protective cover slidably disposed on said shaft on top of and supported by said member of spongy material and substantially entirely covering said charged member of spongy material from the top and sides of said member, said protective cover being slidable along said shaft away from said member of spongy material a distance such that said member is exposed form above, thereby permitting said member to be recharged from above with said insect repelling substance when said insect repelling substance becomes dissipated or ineffective, without removing said protective cover or said member from said shaft;

at least one of said member of spongy material and said protective cover contacting said shaft around substantially the entire outer periphery of said shaft for preventing passage of such crawling insects along said shaft from such first location to such second location between said shaft and said member of spongy material or said protective cover.

2. A barrier according to claim 1, wherein said body of said member of spongy material forms an enclosure around an opening, said shaft being received in said opening, said body having a radial split entirely through said body on one side thereof, the free ends of said body at said split being movable away from and toward one another to open and close said body, respectively.

3. A barrier according to claim 2, wherein said body of said member of spongy material includes a first latch portion on one free end of said body and a second latch portion on the other free end of said body at said radial split, said first and second latch portions being engageable with one another when said body is in closed position for locking said free ends together.

4. A barrier according to claim 1, and further including a retainer member removably mountable on said shaft below said member of spongy material for supporting said member of spongy material on said shaft.

5. A barrier according to claim 1, wherein said insect repelling substance is an insecticide.

6. A barrier according to claim 5, wherein said insecticide is relatively long-lasting and powerful.

7. A barrier according to claim 1, wherein said member of spongy material is in a close fitting relationship with said shaft around the entire perimeter thereof for preventing passage of such insects from such first location to such second location along said shaft between said shaft and said member of spongy material.

8. A barrier according to claim 1, wherein said protective cover is in a close fitting relationship with said shaft around the entire perimeter thereof for preventing passage of such insects from such first location to such second location along said shaft between said shaft and said protective cover.

9. A barrier for placement on a dish having side walls for preventing crawling insects from passing from a first location on the dish below the barrier to a second location on the dish above the barrier, comprising:

a member of spongy material mounted on and substantially entirely surrounding said dish, said member of spongy material being charged with an insect repelling substance; and a protective cover disposed on said dish and substantially entirely covering said charged member of spongy material from the top and sides of said member;

at least one of said member of spongy material and said protective cover including means for preventing passage of such crawling insects along said dish from such first location to such second location between said dish and said member of spongy material or said protective cover, said protective cover including an outwardly extending flange disposed on said walls at the upper ends thereof and surrounding said dish, and a downwardly extending lip around the outer periphery of said flange, said member of spongy material being mounted on the underside of said flange substantially entirely within and covered from the top and the sides by said flange and said lip, respectively.

10. A device for placement on an insect-infested ground area for effectively maintaining an insecticide thereunder, comprising:

a protective cover member adapted for placement on said insect-infested ground area and having an upper cover portion and a downwardly extending lip around the outer periphery of said upper cover portion;

a downwardly extending shaft disposed on the underside of said upper cover portion near its center, said shaft having a free end and being adapted at said free end for insertion into the insect-infested ground area for securing said protective cover in place;

an integral member comprising a body of spongy material slidably disposed on said shaft and housed under said upper cover portion and within said lip, said member of spongy material being removable from said shaft at said free end; and a retainer slidably disposed on, from said free end of said shaft, and frictionally retained on said shaft below said member of spongy material for retaining said member of spongy material in place.

11. A device according to claim 10, wherein said member of spongy material is charged with an insecticide effective for killing the insects.

12. A device according to claim 10, wherein said shaft comprises an anchor stake.

13. A device according to claim 10, wherein the diameter of said protective cover is substantially as great as the diameter of the insect-infested area.

* * * * *